United States Patent [19]

Stoffel

[11] Patent Number: 4,762,037
[45] Date of Patent: Aug. 9, 1988

[54] FACE AND INTERNAL TURNING HEAD
[75] Inventor: Kurt Stoffel, Horgen, Switzerland
[73] Assignee: K. R. Pfiffner Engineering, Langnan am Albis, Switzerland
[21] Appl. No.: 905,720
[22] Filed: Sep. 9, 1986
[30] Foreign Application Priority Data Sep. 10, 1985 [CH] Switzerland ............... 3901/85

[51] Int. Cl.$^4$ .................................................. B23B 3/26
[52] U.S. Cl. ........................................ 82/2 E; 82/1.2; 82/2 A
[58] Field of Search .............. 82/1.2, 1.4, 2 E, 19, 82/61, 64, 66, 67, 68

[56] References Cited

U.S. PATENT DOCUMENTS

| 3,710,659 | 1/1973 | Pagella et al. | 82/2 E |
|---|---|---|---|
| 3,744,352 | 7/1973 | Scholl | 82/2 E |
| 4,411,178 | 10/1983 | Wachs et al. | 82/2 E |
| 4,573,379 | 3/1986 | Bald | 82/2 E |
| 4,573,380 | 3/1986 | Bald | 82/2 E |
| 4,599,769 | 7/1986 | Latzko et al. | 82/2 E |
| 4,612,834 | 9/1986 | Wheeler | 82/19 |

FOREIGN PATENT DOCUMENTS 2143924 3/1973 Fed. Rep. of Germany .

Primary Examiner—Frederick R. Schmidt
Assistant Examiner—William E. Terrell
Attorney, Agent, or Firm—Helfgott & Karas

[57] ABSTRACT

The apparatus has a drive hub with a fixing pin and driving flange. A cross slide carrying a tool is displaceably guided in the flange. Displacement takes place by a guidance roller, which fits into a guidance groove of a planetary web of a planetary gear constructed as a cam plate. Together with a further similar planetary gear, the first planetary gear forms a planetary power split transmission, on which is superimposed the rotary movement of an annular motor. As a result of the rotary movement of the cam plate with the guidance groove the displacement of the cross slide is brought about. Using an envelope drive, the rotary movement of the motor is transferred to a tachoalternator with a pulse generator. The pulses of the pulse generator are processed in a processor, which controls the motor and therefore the displacement movement of the cross slide. Compared with known apparatuses, the apparatus is characterized in that the motor housed in annular manner in the casing and the transmission constitute an independent unit requiring no additional drive parts outside the apparatus.

5 Claims, 1 Drawing Sheet

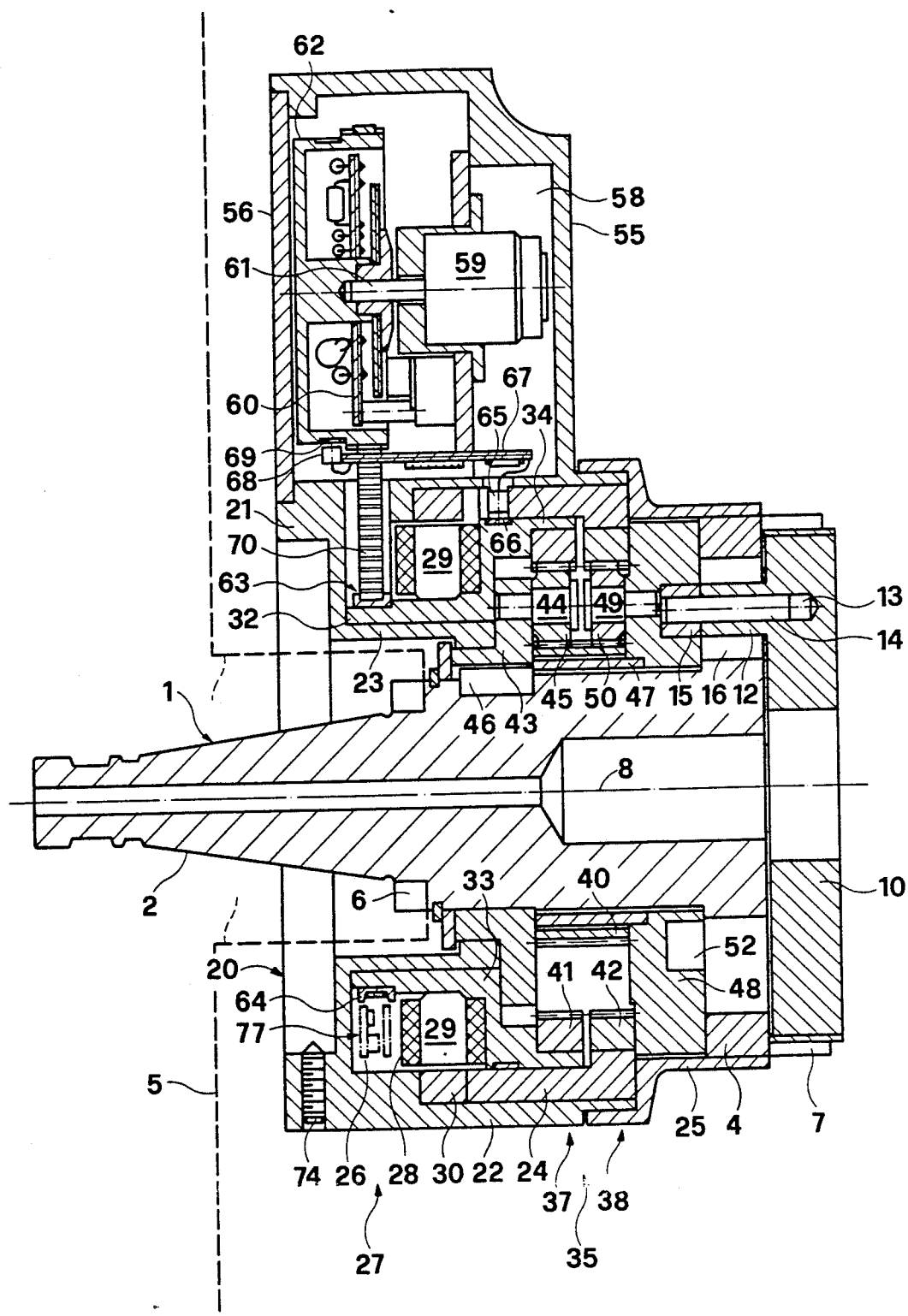

FACE AND INTERNAL TURNING HEAD

BACKGROUND OF THE INVENTION

The present invention relates generally to turning machines such as lathes or the like and more particularly a face and internal turning head for such a machine having a cylindrical drive device which is equipped with a fixing pin and which is adapted to be secured to the front face of the work spindle of a cutting machine. A tool slide that is frontally positioned on the drive means and is radially displaceable by means of a planetary power split transmission surrounding the drive means. For the displacement movement of the tool slide it is possible to superimpose on the hydrostatic power split transmission a rotary movement produced by a motor.

Numerous different constructions of face and internal turning heads are known. They are constructed as attachments for machining units, i.e. for conventional milling machines, boring mills and standard components enabling lathe work to be carried out, which requires a feed movement at right angles to the work spindle rotation axis. If the work spindle is mounted in a spindle sleeve or displacement slide, the face and internal turning head can perform an independent longitudinal movement, so that the head can not only be used for facing, but also for drilling or boring work involving large diameters.

Whereas in the case of simple face and internal turning heads, the displacement of the tool supported on the tool slide is performed manually, an automatic radial displacement of the tool with respect to the drive spindle axis performable automatically with a control means is also known (DE-OS No. 21 43 924 and European patent application No. 54 838). However, it is a disadvantage of both known constructions, that a drive motor must be housed in the machine casing and this is controlled by a control system, e.g. a digitally controlled means. This requires a relatively large volume of space, which is not normally available, particularly in the case of the spindle sleeve mounting of the drive spindle. It is therefore difficult to use the known face and internal turning heads for the turning of large bores.

SUMMARY OF THE INVENTION

The object of the present invention is to construct a face and internal turning head of the aforementioned type, wherein there is no longer any need for a separate arrangement of a drive motor for the displacement of the tool with the corresponding space requirements. At the same time the present invention assumes that there is no increase in the constructional volume of the face and internal turning head.

According to the invention this objective is achieved in that a ring surrounds the drive means in an annular manner, the head is mounted in the casing and is in operative connection with the planetary power split transmission.

Appropriately the motor stator is mounted in the casing and is fixed counter to tangentially acting forces on the upright standard, to the spindle sleeve or to the slide of the cutting machine. The rotor is in operative connection with the rotary part of the planetary power split transmission.

DESCRIPTION OF THE DRAWING AND PREFERRED EMBODIMENT

The invention is described in greater detail hereinafter relative to a non-limitative embodiment. The attached drawing shows one embodiment of a face and internal turning head according to the invention in a longitudinal, cross-sectional view.

The drawing shows a cylindrical drive means 1, provided on one end with a conical mounting pin 2 and whose other end includes a driving flange 4. The mounting pin 2 is fixed in a work spindle (not shown) of a cutting machine, indicated schematically as broken line 5 and which has a correspondingly shaped conical bore. Sliding blocks (not shown) are provided in a well known manner for actuating the drive means 1 through the work spindle.

The driving flange 4 has a guidance groove 7 passing radially through the work spindle rotation axis 8, e.g. in form of a dovetail groove, in which is displaceably guided a cross slide 10, which carries a machining tool (not shown). On the side of the cross slide 10 remote from the tool is provided an axially arranged pin 12, which has a bore 13. In the bore 13 is inserted a shaft 14, a part projects from the bore 13. The shaft 14 carries a guide roller 15, whose function will be explained hereinafter. The pin 12 extends through a recess 16 formed in the driving flange 4.

The drive means 1 is surrounded by a casing generally designated by the reference character 20, which comprises mounting flange 21, an outer cylindrical sleeve 22, an inner cylindrical connector 23 and a secondary chamber 55. The free end of the outer, cylindrical sleeve 22 is covered by a generally cylindrical closure member 25, which is mounted on the outer circumference of driving flange 4. Together with the casing 20, the closure member 25 protects the parts arranged in the interior thereof against the penetration of dirt and solid fragments. A sleeve 24 is also provided and acts as a bearing part for the fixed, hollow wheel 42 having internal, gear-type teeth. A sealed cover 56 prevents dirt and solid fragments from penetrating into the secondary chamber 55.

A motor, generally designated by the reference character 27, is mounted in an annular zone 26 formed by the outer cylindrical sleeve 22 and the inner, cylindrical connector 23. In the drawing, the motor 27 is shown in the form of an electric direct current motor, but it could also be a hydraulic motor or the like. The motor 27 has an annular configuration and includes a rotor 29 provided with a winding 28 and a stator 30, the stator 30 being firmly secured to the inside surface of the outer cylindrical sleeve 22. The stator 30 is formed from permanent magnets. Such annular electromotors are commercially available, e.g. from Litton, etc.

The rotor 29 and the winding 28 of the motor 27 are secured on a bearing sleeve 32, which is mounted in a rotary manner on the outer circumference of the inner, cylindrical connector 23 of the casing 20. A transverse or radial flange 33 with a cylindrical, axially extending collar 34 is formed integrally with the bearing sleeve 32.

A planetary power split transmission generally designated by the reference character 35 is formed from two successively connected, similar planetary gears 37 and 38 and is located between the motor 27 and the driving flange 4. The two planetary gears 37 and 38 have a common sun wheel 40 and fixed, hollow wheels 41 and 42. The planetary gear 37 closer to the motor 27 includes a transverse flange 43 in which a plurality of planetary gears 45 are mounted in a rotary manner by means of shafts 44. The flange 43 is secured to the drive means 1, for example, by means of a key and keyway joint 46.

The planetary gear 38 located on the side of the driving flange 4 also includes a transverse flange 48, in which planetary gears 50 are mounted in a rotary manner by means of shafts 49. In addition, on the flange 48, there is secured a sleeve 47, on which the common sun wheel 40 is mounted in a rotary manner.

The flange 48 of the planetary gear 38 is constructed as a cam plate and is provided on the side remote from the planetary gear 38 with a guidance groove 52, which is constructed as an archimedeon spiral or as a spiral with a random pitch. The guidance groove 52 receives the guide roller 15 of the cross slide 10. If the flange 48 has a different speed than the drive means 1, the guide roller 15 and therefore the cross slide 10 is moved at right angles to the rotation axis 8 of the drive means 1.

On the outer circumference of the outer cylindrical sleeve 22 is mounted the secondary chamber 55. In a recess 58 therein is mounted a combination of a tachoalternator 59 and a pulse generator 60. The tachoalternator 59 has a shaft 61 with cup-shaped pulley 62, the latter being part of a drive system 63, which comprises the pulley 62, teeth 64 formed on the outer circumference of the bearing sleeve 32 and actuating means, such as, a toothed belt 70. If the bearing sleeve 32 turns, this rotary movement is transferred via the drive system 63 to the shaft 61 of the tachoalternator 59 and the pulse generator 60 combination. The tachoalternator 59 and the pulse generator 60 form the acknowledgment system, which supplies the corresponding voltages and pulses, which are processed in a processor (not shown) and which is used for regulating the position of the motor 27.

Signaling devices 65 and 68, which may be optoelectrical, inductive or mechanical switches, which are actuated on the basis of a coding or scanning on the coding or code strips 66 and 69, respectively, are used for detecting the absolute mechanical end position of the guide roller 15 in the spiral guidance groove 52 of the web 48, which prevents any interference between the pin 12 and the inner face of the recess 16 and the driving flange 4. A special electronic evaluation logic in surface mounting device (SMD) technology is housed in the recess 58 on a circuit board 67, which is also in a position to provide a CNC master processor with a reference point as an absolute position. This is brought about in that, due to the different rotation angles of the externally toothed bearing sleeve 32 (600° per revolution of the flange 48) and the pulley 62 (720° per revolution of the flange 48) on the code strips 66 and 69. In each case two codes can be provided in such a way that the two specific signaling devices 65 and 68 simultaneously respond only once per revolution of the spiral guidance groove 52. Consequently a logic AND-operation of these two signaling devices 65 and 68 corresponds to an absolute position of the three rotating bodies (namely, the flange 48, the pulley 62 and the bearing sleeve 32).

The described face and internal turning head can, for example, be provided for use on a CNC-controlled machining unit, but it can also be used on other CNC-controlled machines. The drive means 1 is provided with the conical mounting pin 2, e.g. ISO 30 in the work spindle 5 and is tightened by a tie rod (not shown). The stationary part, that is the casing 20, is fixed by three threaded pins 74 on the bearing flange of the machining unit, e.g. the spindle sleeve is counter to tangentially acting forces. The electrical connection of the motor 27 and measuring means 59 and 60 is formed by a plug connection (not shown).

The transfer of the torque to the drive means 1 takes place by means of a sliding block projecting into recesses 6 of the drive means 1. During operation, the motor-side flange 43 of the planetary gear 37 that is coupled to the drive means 1 rotates at the spindle speed. The fixed, hollow wheel 41 of the planetary gear 37 is kept stationary by the motor 27 which is running, so that the planetary gears 45 roll on the fixed hollow wheel 41 and drive the sun wheel 40 common to the two planetary gears 37 and 38. The sun wheel 40 rotates the planetary gears 50 of the planetary gear 38 on the side of the cross slide and these roll on the hollow wheel 42 of the planetary gear 38, which is fixed in the sleeve 24. The flange 48 carrying planetary gears 50 is therefore driven in the same rotational direction and at the same speed as drive means 1, so that there is no movement of cross slide 10. This is the operating state of the head when turning cylindrically.

A clockwise or counter clockwise rotary movement can be imparted by the motor 27 to the fixed, hollow wheel 41 of the planetary gear 37. As a result of this superimposing movement the flange 48 of the planetary gear 38, and consequently the spiral guidance groove 52 formed in the latter rotate, so that the guide roller 15 and consequently the cross slide 10 are moved. The stroke of the cross slide 10 is appropriately covered during a rotation of the spiral guidance groove 52 in the flange 48 over an arc 360°. The use of an archimedeon spiral groove 52 as the guide for the guidance roller 15 leads to a considerable force increase directly on the cross slide 10, which is favorable with regards to the loading of the head.

If, for example, the pulse generator 60 generates 1250 pulses per revolution and in the case of a quadruple evaluation, as well as a ratio of the pulse generator 720° and the flange 360°, 10,000 pulses are available for the complete planar stroke of e.g. 10 mm, so that a pulse with a length of 1 um is obtained. Thus very high precision levels can be achieved with the present face and internal turning head.

The advantage of the described head is that it has a small constructional volume, but still contains the drive motor, so that it represents an autonomous unit.

I claim:
1. A face and internal turning head comprising:
cylindrical drive means including a fixing pin adapted to be mounted on the front face of work spindle of a cutting machine;
a casing surrounding the drive means;
a rotary motor disposed in the casing and surrounding the drive means in annular manner, the motor having a rotor;
a tool slide mounted on the front of the driving means outside of the casing and radially displaceable with respect to the driving means;
a planetary transmission disposed in the casing and surrounding the drive means, the transmission being axially displaced from the motor, the transmission including first and second series-connected identical planetary gears and a sun wheel common to both gears, the first gear having a web coupled to the drive means and having a hollow wheel which is connected to and is rotated by the rotor, the second gear having a web mounted in rotary manner on the drive means and arranged on the side of the tool slide, the second gear web having a bearing sleeve, the sun wheel being guided in a rotary manner by the bearing sleeve, the second gear web being constructed as a disk cam having a frontal guidance groove in the form of an archimedeon spiral or a spiral with a random pitch ratio.

2. The face and internal head according to claim 1, wherein the drive means has a driving flange for guiding the tool slide, the latter being equipped with a guide roller projecting into the guidance groove of the disk cam.

3. The face and internal turning head according to claim 1 and further including an electronic circuit in the recess and which, as a result of the rotation angle of a pulley and a bearing sleeve, as well a coding on the code strips, is able to interpret the switching state of a signal generator as an absolute position of the spiral and therefore also the tool slide and transfer same as a logic level to a process computer.

4. The face and internal turning head of claim 1 further including means for measuring the rotational speed of the rotor.

5. The face and internal turning head of claim 1 further including means for measuring the rotational speed, the position change and the absolute position of the rotor.

* * * * *